Mar. 20, 1923.

E. C. HUTCHINSON ET AL 1,449,006

VERTICAL TURBINE CONSTRUCTION

Filed Mar. 1, 1922

INVENTORS
E. C. Hutchinson, and
E. Buehle.

Patented Mar. 20, 1923.

1,449,006

UNITED STATES PATENT OFFICE.

ELY C. HUTCHINSON, OF OAKLAND, AND ERICH BUEHLE, OF SAN FRANCISCO, CALIFORNIA, ASSIGNORS TO PELTON WATER WHEEL CO., OF SAN FRANCISCO, CALIFORNIA, A CORPORATION OF CALIFORNIA.

VERTICAL TURBINE CONSTRUCTION.

Application filed March 1, 1922. Serial No. 540,205.

*To all whom it may concern:*

Be it known that we, ELY C. HUTCHINSON and ERICH BUEHLE, citizens, the said HUTCHINSON of the United States and the said BUEHLE of Germany, residing, the said HUTCHINSON at Oakland, in the county of Alameda and State of California, and the said BUEHLE at the city and county of San Francisco, State of California, have invented certain new and useful Improvements in Vertical Turbine Constructions, of which the following is a specification.

The present invention relates to an improvement in vertical turbine construction of the type set forth in the co-pending method application #540,204, filed under even date herewith, the present construction enables the changing of the turbine runner without disturbing the guide vanes or any of the superimposed structure.

Vertical turbine constructions, as at present installed, require, when it is desired to change or renew the runner, that the casing or cover plate, shaft and runner and oftentimes some of the superimposed mechanism interconnected with the shaft, be removed to permit access to the runner for its removal from the casing or volute and a new runner positioned in place thereof.

By our present construction, we overcome the necessity of in any manner disturbing the superimposed mechanism, the casing or cover plate, the shaft or upper works of the installation, and permit easy access to be had to the runner from beneath by the removal of the draft tube and the lower cover plate, which affords an opening in the installation, which permits of the insertion or removal of a runner thereinto or therefrom, without in any manner interfering with the mounting or construction of the guide vanes. A further object of this invention is to provide means for anchoring or holding the lower end of the draft tube relative to a permanent outlet to provide means for facilitating the movement of the draft tube when disassembled, to and from the construction, to provide means for raising and lowering the runner and a section of the draft tube, and broadly to improve the general construction of vertical turbine installations generally.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention reference is directed to the accompanying drawings, wherein—

Figure 1:
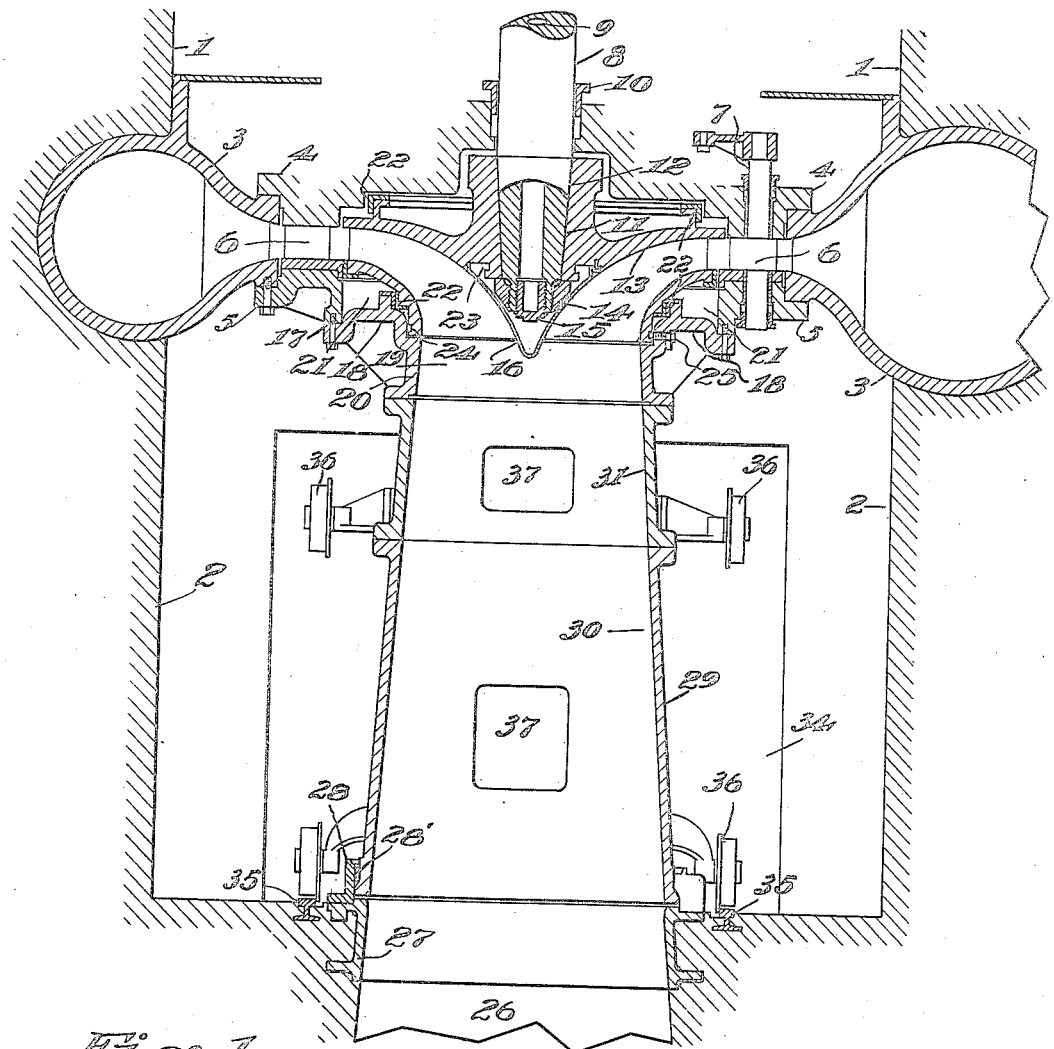
Fig. 1 is a vertical sectional view of a vertical turbine runner construction disclosing one embodiment of our invention.
Figure 2:
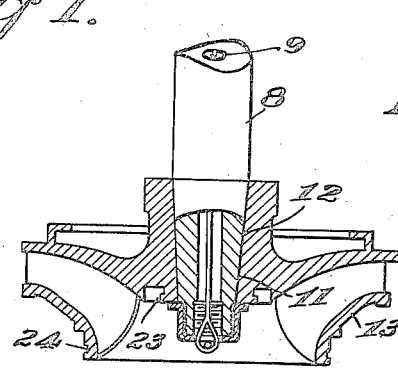
Fig. 2 is a view in vertical section of the runner and a portion of the shaft, illustrating the manner of lowering the runner on the detachment of the same from the shaft.
Figure 3:
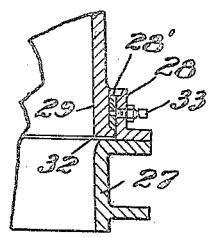
Fig. 3 is a fragmentary view of the packing gland and centering device associated with the lower end of the draft tube.

In the drawings, wherein like characters of reference designate corresponding parts, 1 indicates a wall or foundation within which is formed a depression or recess 2 and within the wall 1 is preferably permanently anchored or fixed at a point above the bottom of the recess 2 a turbine volute or casing 3, of the well known construction. The volute or casing is constructed with an upper cover plate 4 and the lower cover plate ring 5 held thereto in any suitable manner, and between which are mounted the usual turbine guide vanes 6 operated by the movement of the stem 7. Vertically through the center of the plate 4 extends a shaft 8 formed with the central bore 9, the shaft being rotatably mounted to connect at its upper end with any suitable mechanism to be driven. A gland 10 surrounds the shaft 8 at its point of passage through the plate 4. The shaft at its lower end depending into the chamber in the center of the casing or volute 3 is tapered as at 11, and over this tapered end is fitted the tapered hub 12 of a runner 13 of the well known turbine construction. The runner is held to the end of the shaft by a lock nut 14 threaded to the end of the shaft and bearing on the lower end of the hub of the runner, and the bore 9 of the shaft is closed by a closure nut 15.

To carry out the most efficient configuration for the axis of rotation of the runner, the lock nut 14 and closure nut 15, together with the lower end of the shaft 8, are protected and concealed by a shell 16, preferably conical in form and preferably detachably secured to the runner 13, as in the drawing.

Detachably secured to the inner edge of the lower cover plate ring 5, as at 17, is a lower cover plate 18, formed with a central opening 19 and a downwardly extending tapering flange 20, providing an opening immediately beneath the axis of rotation of the runner, which opening affords the upper end of a discharge leading into a draft tube, hereinafter described.

Within the chamber 21, afforded by the plates 4, 5 and 18, and within which the runner 13 revolves, we position at the necessary points of wear, the usual wear rings 22. The runner 13 at the lower end of its hub 12 is formed with an annular groove 23 and on the periphery of its outer wall, adjacent its lower edge, the runner is also formed with an annular groove 24. The grooves 23 and 24 are utilized when the runner is removed from the shaft 8 and a new one is applied.

The lower cover plate 18 is provided in its wall, at a point opposite the annular groove 24 in the wall of the runner 13, with a plurality of bolts 25, adapted for inward threading for reception within the groove 24 to unite the lower cover plate 18 to the runner 13 when the runner is removed from the shaft 8, at which time the runner and cover plate are held to the lower cover plate ring 5 by the bolts 17.

Leading from the center of the lower wall of the chamber 2 is an outlet 26 for the fluid passing through the draft tube and upper edge of the same is surrounded by a reinforcing or protecting band 27 on which rests the base of a ring 28 detachably secured thereto and divided vertically into a plurality of interconnected sections. Into the ring extends the lower end of the lower section 29 of a draft tube 30 detachably secured at its upper end to the lower end of the upper section 31 of the draft tube, which in turn is detachably secured to the lower end of the flange 20.

It will be observed that the lower edge 32 of the lower section 29 of the draft tube 30 normally lies in slight spaced relation above the upper surface of the member 27, this being accomplished by hanging or depending the draft tube interconnected sections from the flange 20 of the lower cover plate 18. To afford a tight joint between the lower edge of the lower section 29 and the inner face of the ring 28, a suitable packing is interposed between opposing surfaces and to maintain the draft tube centered within the ring 28, adjusting screws 33 are provided, disposed radially of the ring 28.

The wall 1 at one side of the recess or chamber 2 is formed with an opening 34 and through the same extends the parallel supporting rails or tracks 35 disposed one on each side of the member 27, as in Fig. 1. The rails 35 are adapted to support the wheeled trucks 36 at the lower ends of the respective sections 29 and 31 of the draft tube 30 to facilitate the movement of the sections to and from the chamber 1, when desired.

To gain access to the interior of the draft tube, the same is provided with covered manholes 37.

When it is desired to remove the runner 13, the same can be accomplished very quickly by our present construction. First the operator opens the manholes 37 of the lower draft tube section 29, by which method he obtains access to the lower end of the runner 13, from which he then removes protecting shell 16, and nut 15.

A suitable cable is then lowered through the bore 9 of the shaft 8, which by proper connection is secured to the lower draft tube section 29. The ring 28 is then removed and the bolted flanges joining lower draft tube section 29 and upper draft tube section 31, are disconnected.

The crane cable is then lowered, permitting the truck wheels 36 to rest on tracks 35. The section 29 is then conveyed to the chamber through the opening 34. The removal of the runner 13 is then continued by taking off nut 14, and suitably connecting the crane cable to the lower part of the runner 13, and thus lowering the runner. The runner is then interlocked to the lower cover plate 20 by the bolts 25 and the bolts 17 removed.

The crane cable is then lowered, permitting the truck wheels 36 on upper draft tube section 31 to rest on the tracks 35. After which procedure, this section and runner are removed from the chamber 2 to a point where the runner is changed.

With the new runner in position, and securely locked by the bolts 25 to the section 20, this consolidated portion is returned to a point beneath the shaft 8, and by the crane cable or other suitable means, is raised and connected as before. The sections 20, 31 and the runner 13 are raised as a unit and the bolts 17 are replaced, and after this, the bolts 25 are removed and the runner 13 is raised by any suitable mechanism, and fitted upon the lower end of the shaft 8. The nut 14 is then positioned, and the lower draft tube section 29 is then wheeled into place and raised by the crane cable to properly connect at the flange joint between sections 29 and 31.

The nut 15 is then positioned in the shaft 8 and the cover plate 16 is mounted to conceal the same. The ring 28 is then assembled around the lower draft tube section 29, and bolted to ring 27. The joint 28' is made as a water tight seal.

We claim:—

1. A vertical turbine construction comprising a fixed horizontally disposed casing, a plurality of guide vanes carried thereby, said casing formed on its underside with an opening through which a runner is adapted for insertion and removal, a vertically disposed runner supporting shaft depending into said casing, a runner detachably secured to the lower end of said shaft, a ring for closing said opening, and means for temporarily securing said ring and runner together to permit the same to be raised and lowered relative to said opening as a unit.

2. A vertical turbine construction comprising a fixed horizontally disposed casing, a plurality of guide vanes carried thereby, said casing formed on its underside with an opening through which a runner is adapted for insertion and removal, a vertically disposed runner supporting shaft depending into said casing, a runner detachably secured to the lower end of said shaft, a ring for closing said opening, means for temporarily securing said ring and runner together to permit the same to be raised and lowered relative to said opening as a unit, a draft tube section carried by said ring, and means associated with said section for facilitating its movement to and from beneath the casing when desired.

3. A vertical turbine construction comprising a casing, a runner therein, a shaft depending into the casing and to the lower end of which the runner is detachably secured, said runner provided with a plurality of annular grooves, one formed in the lower edge of its hub and the other in the outer wall of the lower peripheral edge.

4. A vertical turbine construction comprising a fixed casing, a draft tube leading therefrom, a supporting shaft extending into the casing, a runner detachably secured thereto, a plurality of guide vanes surrounding the periphery of the runner, a cover plate ring mounting corresponding ends of the guides, said runner adapted for removal from the casing through the opening afforded by the removal of the draft tube without removing the cover plate.

In testimony whereof we have signed our names to this specification.

ELY C. HUTCHINSON,
ERICH BUEHLE.